United States Patent [19]

Jasnosz

[11] 4,001,378
[45] Jan. 4, 1977

[54] ANTI-CAKING OF NITROGENOUS MATERIALS

[75] Inventor: John J. Jasnosz, Huntington Beach, Calif.

[73] Assignee: Petrochemicals Company, Inc., Fort Worth, Tex.

[22] Filed: Nov. 12, 1975

[21] Appl. No.: 631,111

Related U.S. Application Data

[63] Continuation-in-part of Ser. No. 421,248, Dec. 3, 1973, abandoned.

[52] U.S. Cl. .............................. 423/268; 260/655; 71/28; 71/64 E
[51] Int. Cl.$^2$ ..................... C01B 21/48; C05C 1/60
[58] Field of Search ............. 423/268, 396; 71/28, 71/50, 59, 60, 64 E; 260/655 C; 252/383, 384

[56] References Cited

UNITED STATES PATENTS

| | | | |
|---|---|---|---|
| 2,826,612 | 3/1958 | Over et al. ...................... | 260/555 C |
| 3,169,053 | 2/1965 | Sawyer et al. ...................... | 71/64 E |
| 3,223,478 | 12/1965 | Wilson ................................ | 423/268 |
| 3,230,038 | 1/1966 | Wilson ................................ | 423/268 |
| 3,660,070 | 5/1972 | Maruta et al. ...................... | 71/64 E |

*Primary Examiner*—G. O. Peters
*Attorney, Agent, or Firm*—James C. Fails

[57] ABSTRACT

Composition of matter and process effecting a nitrogen-containing material that flows freely and resists caking even on prolonged storage. It can be manufactured to yield a desired percent nitrogen upon analysis characterized by the nitrogen-containing material in its normal manufactured form having on the external surface thereof an amount that is sufficient to reduce its normal caking tendencies an alkene sulfonate containing from 6 to 26 carbon atoms, inclusive. Further reduced caking tendency is effected by including on the surface of the nitrogen-containing material an inert material, such as clay. Also disclosed are the effective and optimum amounts of the respective materials that are added, the amounts being given as an average percent by weight basis.

11 Claims, No Drawings

ANTI-CAKING OF NITROGENOUS MATERIALS

This application is a continuation-in-part of application Ser. No. 421,248, filed Dec. 3, 1973, and now abandoned.

BACKGROUND OF THE INVENTION

1. Field of the Invention

This invention relates to reducing the caking tendency of nitrogenous, or nitrogen-containing, materials. More particularly, it relates to a method and composition effecting a free flowing nitrogen-containing material that can be prepared in a composition that will yield the desired percent by weight nitrogen analysis. In specific aspects, this invention relates respectively to: (1) production of treated, non-caking nitrogen-containing salts, such as ammonium nitrate; these treated salts being valuable as free flowing fertilizer with little or no tendency to cake on standing; (2) nitrogen-containing salts, such as ammonium nitrate, treated to reduce their normal tendency to cake on standing and to explosive compositions containing such treated salts; and (3) novel two-component anti-caking agents, useful in treating such salts and to a method of preparing such anti-caking agents.

2. Description of the Prior Art

Maintenance of a free flowing nitrogen-containing material in its manufactured form, either crystalline, granular or pellets, under long term storage conditions, has long been a problem in the art. The term "particles" will be employed herein in its broad sense to include all of these forms of the nitrogen-containing material. Most of the nitrogen-containing salts or materials have a normal tendency to cake or become sticky on standing and form hard masses, regardless of the form in which they are manufactured. This caking is usually promoted by changes in humidity, temperature and/or pressure and occurs under conditions during storing, shipping and handling.

The tendency of these salts to cake on standing presents difficulties in handling and use of such salts. For example, where such nitrogen-containing salts are used as fertilizers, this caking tendency impairs the durability of the fertilizer, increases the effort and cost of uniformly distributing the fertilizer in the field because caked fertilizer causes clogging of distribution machinery and other handling problems. Similarly, where nitrogen-containing salts, such as ammonium nitrate, are used as ingredients in explosive compositions, the caking tendency of such salts adversely affects the sensitivity of the explosive composition and may render it incapable of satisfactory detonation.

Many methods have been proposed in the past for overcoming, reducing or preventing the normal tendency of such nitrogen-containing materials to cake on standing. This problem of reducing the caking tendency, or imparting the anti-caking property, is worsened where the nitrogen-containing material has to meet a particular percent nitrogen analysis such that the amount of additive is limited if the nitrogen-containing material is to meet specifications. For example, it is known that urea must have a particular minimum percent nitrogen on analysis, such as about 45 percent and, preferably, 46 percent. A large number of excellent discussions of the problem are contained in the literature and U.S. patents. Typical of the art directed at, for example, urea is CHEM TECH, "Urea Technology — a Critical Review," A. V. Slack and G. M. Blouin, January 1971, pages 32–40; and U.S. Pat. Nos. 3,112,343; 3,123,637; and 3,535,376. A review of the patent art alone indicates that a wide variety of methods and agents have been employed in attempting to prevent caking of nitrogen-containing materials. For example, the patents have shown the following materials, as illustrative of the classes of materials which have been employed heretofore: (1) ammonia; (2) magnesium carbonate; (3) film of metal resinate and gelled hydrocarbon; (4) basic aluminum sulfate; (5) substituted urea, added during manufacture or to the finished prills; (6) a variety of heat treatments; (7) urea-formaldehyde condensation product in homogeneous composition of matter; (8) kaolin and alkali metal salts of alkyl arylsulfonic acids; (9) aliphatic amines; (10) sugar; (11) amine treated clays where the amine is a primary n-aliphatic mono amine containing 8–22 carbon atoms and preferably employing an oily solvent for the amine, an oily solvent being a hydrocarbon or a fatty acid nitrile containing 18–22 carbon atoms; (12) urea coated with a thin layer of a condensate of urea reacted with a vapor of a lower aldehyde or ketone in a uniform admixture of the vapor and urea at a temperature greater than 50° C. and less than the melting point of urea; (13) lower carboxylic acid amides; (14) dispersions of paraffin waxes and urea overlaid with wax-urea adducts; and (15) respective screening and heating to optimize the size; for example, particles passing through 8 and not through a number 40 screen size; and moisture content; for example, 0.3–0.8 percent by weight. Some of these additives, or methods, were elaborate and expensive but were at least partially successful; while others were relatively unsuccessful. Similarly, other patents, such as U.S. Pat. No. 3,116,185 have reported on a wide variety of different additives and methods attempting to impart anti-caking property.

The closest art of which I am aware is U.S. Pat. No. 3,660,070. That patent describes a much more complicated process than this invention and effects a much more complicated composition of matter. Therein, an aqueous solution of alkyl sulfates, alpha-olefin sulfonates or alkyl sulfonates containing 6–10 carbon atoms are employed as a solubilizer to dissolve in aqueous solution water insoluble polymers; and the resulting aqueous solution is interacted with the fertilizers. The resulting fertilizer forms a hard cake that has to be reground. Thus, this complicated process is not totally satisfactory for a simple, economical solution as desired.

Despite the urgent problem, as attested to by the large number and variety of patents and solutions, the prior art has not yet developed a satisfactory solution which will enable the preparation of an anti-caking nitrogen-containing material that will yield the desired percent by weight nitrogen upon analysis; yet will flow freely, will resist caking on long term storage, is simple enough and employs an economical enough additive not to be prohibitively costly.

SUMMARY OF THE INVENTION

It is an object of this invention to obviate the disadvantages of the prior art methods and compositions and provide method and composition effecting a nitrogen-containing material that can be manufactured in an economical composition that will yield the desired percent by weight nitrogen upon analysis, yet will flow freely and resist caking.

In accordance with this invention, the nitrogen-containing material, in whatever form it is manufactured, has its surface coated with an effective amount that is sufficient to reduce the normal caking tendency thereof, of an alkene sulfonate containing from 6 to 26 carbon atoms, inclusive.

In another embodiment of the invention for even further reduction of the caking tendencies of the nitrogen-containing material, an amount of finely divided inert material; such as, clay like kaolin and Kieselguhr; is also added, although the proportion thereof can be less than the proportion previously indicated to be necessary in the prior art.

DESCRIPTION OF PREFERRED EMBODIMENTS

The nitrogen-containing material, with its good anti-caking properties, is produced by ultimately adding the desired amount of the alkene sulfonate to the manufactured nitrogen-containing material. In this way, the added alkene sulfonate is concentrated on the surface of the particles of the nitrogen-containing material, whether it be in crystalline, granular or pelletized form. Any method, including prior art methods of treatment, that will take advantage of the useful properties induced by the addition of the alkene sulfonate may be employed in effecting a treated nitrogen-containing material in accordance with this invention. We have found, however, that the alkene sulfonate is more effective if it contacts a solid surface, such as in either the cured or uncured, but pre-manufactured, nitrogen-containing material or finely divided inert material as discussed later hereinafter.

When the alkene sulfonate is employed alone to impart the anti-caking property, it is first dried to the form of dried solids, or powder, if it is not already a dried solid. Most of the commercially available salts of the alkene sulfonates, as delineated hereinafter and all those delineated and employed in the Examples later hereinafter, are and were in the form of dried solids, or powder.

In the form of the dried solids, the alkene sulfonates are added to, as by sprinkling onto, the nitrogen-containing material and admixed, as in a rotating drum or kiln. In this way the alkene sulfonates maintain their discrete identity, are much simpler to apply and are advantageous over a solution containing resin and requiring regrinding.

Other methods of treatment may be employed when the alkene sulfonate and the finely divided inert material are employed to impart the anti-caking property.

Ordinarily, the methods of treatment will fall into one of four major categories. The four categories are: (1) treat the nitrogen-containing material with the alkene sulfonate and then admix with a finely divided inert material, whether the latter has been treated or not; (2) treat the finely divided inert material with the alkene sulfonate and then admix with the nitrogen-containing material, whether the latter has been treated or not; (3) admix the nitrogen-containing material and the finely divided inert material and then treat the resulting mixture with the alkene sulfonate; and (4) treat the nitrogen-containing material and the finely divided inert material, individually, with the alkene sulfonate and then admix the resulting products.

If the nitrogen-containing material is being sold as it is manufactured, the alkene sulfonate is added as close to the final finishing vessel as practicable. On the other hand, the nitrogen-containing material may be stored, or cured, for a relatively short interval of time and then treated with the alkene sulfonate for prolonged storage. If desired, the nitrogen-containing material may be treated and stored; with the finely divided inert material, if employed, added at the time of shipment. The finely divided inert material may be added concurrently with, or shortly after the alkene sulfonate. Pre-treating the finely divided inert material with the alkene sulfonate is beneficial in that it reduces the dust in handling of the finely divided inert material. It also enhances the adhesion of the finely divided inert material to the particles of the nitrogen-containing material.

In carrying out the invention as outlined, the alkene sulfonate contains from 6 to 26 carbon atoms, inclusive. As can be seen from the examples later hereinafter, the effectiveness of the alkene sulfonates in reducing caking increases somewhat as the number of carbon atoms increases from 6 up to about 18, or more.

The alkene sulfonates have at least one unsaturated bond; for example, in the $\alpha$ position adjacent the sulfonate group on the end carbon atom. Typical alkene sulfonates are exemplified by the following structural formula:

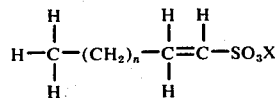

where X is a monovalent cation.

Suitable monovalent cations include the alkali metal cations, ammonium and the amine cations. Of these, sodium is the most practical and economical cation and it will ordinarily be the one employed. As is well recognized, these alkene sulfonates may be prepared from a wide variety of sources. For example, the alpha olefins prepared by polymerizing olefinic groups and moieties have been available for some time. These alpha olefins can be sulfonated to prepare the alpha olefin sulfonates that make economical sources of the alkene sulfonates employed in accordance with this invention. These conventional processes for preparing the polymerized alpha olefins and the resulting sulfonation thereof are well known and need not be described in detail herein. It is sufficient to note that many sources are readily available; for example, Gulf Petrochemicals, P. O. Box 2100, Houston, Tex. can supply a variety of these alpha olefin sulfonates.

Specifically, these alkene sulfonates include hexene-1 sulfonate, octene-1 sulfonate, decene-1 sulfonate, dodecene-1 sulfonate, tetradecene-1 sulfonate, hexadecene-1 sulfonate, octadecene-1 sulfonate, eicosene-1 sulfonate and docosene-1 sulfonate. The odd numbered carbon alkene sulfonates can be employed also if they are available. As indicated, any of the cations may be employed with the foregoing. For example, sodium-, potassium-, ammonium-, or the amine alkene sulfonates are satisfactory.

The finely divided inert material which may be added to "top off" the concentration, or improve the anti-caking properties of the nitrogen-containing material for best overall results, are those ordinarily employed in this art. The finely divided inert materials may comprise materials such as magnesium carbonate on the other powdery or pulverulent materials. Of these materials, the clays, such as kaolin and kieselguhr, are particularly preferred. The inert material preferably has a mean effective diameter that is predominant in the range of about 0.5 microns, although it may range up to a size that will not pass through a 325 mesh screen.

The amount of the additives described hereinafter may be thought of as a proportion or concentration. Ordinarily, the amount is given in percent by weight, based on the weight of the total composition. Since the amount of the alkene sulfonate is so small, however, the amount may be calculated on the basis of the weight of the nitrogen-containing material with very little adverse effect.

An amount as little as 1/8 pound of the alkene sulfonate per ton of unfinished nitrogen-containing material, or 0.00625 percent by weight of the alkene sulfonate, can be employed to effect some reduction in the caking tendency of the nitrogen-containing material. Preferably, however, an amount of at least 0.05 percent by weight of the alkene sulfonate is employed. A particularly preferred amount consists of about 0.1 percent by weight of the alkene sulfonate. The alkene sulfonate still works at concentrations of 0.5 percent and higher, and works even better. Thus, in the ultimate analysis, the percent that will be employed will be a matter of economy and the degree of caking that can be tolerated.

The alkene sulfonates are useful in improving the free flowing and anti-caking properties of any commercial nitrogen-containing product regardless of its nitrogen analysis. They are useful, however, in that they are effective in amounts that are low enough that the desired nitrogen analysis can be obtained for a product that must meet specification. For example, if they are employed with urea they can prevent caking and still enable the urea to meet either the 45 or 46 percent nitrogen analysis as desired. Specifically, if a 46 percent nitrogen analysis of urea is desired, the alkene sulfonate must not exceed 1.43 percent by weight (less moisture and other impurities). In like manner if a fertilizer comprised of ammonium nitrate is to analyze 34 percent nitrogen upon analysis, no more than 2.9 percent by weight of total additives, including moisture and the like can be employed.

Similarly, an amount of the finely divided inert material is added to the surface of the nitrogen-containing material, the amount being sufficient to effect further reduction in the anti-caking properties as further inert material is added. For example, it was taught in the prior art that about 2 percent by weight of clay was necessary. A wide range, including the prior art amounts of finely divided inert material, may be employed in this invention, if desired. For example, 1–50 pounds of clay can be employed per ton of nitrogen-containing material and form a satisfactory product; equivalent to a range of 0.05–2.5 percent by weight. In fact, from a theoretical point of view, up to 3.5 percent by weight of finely divided inert material could be employed and still have a conventional 45 percent nitrogen analysis for urea. With urea, an amount in excess of 1.43 percent by weight limit described above with respect to the alkene sulfonate additives, however, makes it impossible to obtain an anti-caking urea that can analyze 46 percent by weight nitrogen. By similar analysis, if the nitrogen-containing material, such as ammonium nitrate, must meet a given specification of about 34 percent nitrogen for a fertilizer or a 35 percent nitrogen for use with explosives, the maximum concentrations of the finely divided inert material and the alkene sulfonate additive can be calculated. We have found that, when combined with the alkene sulfonates, a low amount of the finely divided inert material can effect a satisfactory product. An amount of at least 10 pounds of finely divided inert material per ton of nitrogen-containing material, or 0.5 percent by weight of the finely divided inert material, can be employed to effect an excellent product. If the nitrogen-containing product is urea it will analyze 46 percent by weight nitrogen. As described hereinbefore with respect to the alkene sulfonate, the maximum amount of both the alkene sulfonate and the finely divided inert material is limited to about 1.43 percent by weight of the composition, if the nitrogen analysis is to be at least 46 percent by weight when the nitrogen-containing product is urea. Thus, where 0.1 percent by weight of the alkene sulfonate is employed, the maximum percent of the finely divided inert materials employed will be about 1.33 percent by weight. On the other hand, with other nitrogen-containing materials, it is frequently possible to employ about 0.99–1.98 percent by weight or more of the finely divided inert material and about 0.1–0.2 percent of the alkene sulfonate.

The conditions of operability are not particularly critical. Ordinarily, it is satisfactory to simply spray the alkene sulfonate into and thoroughly mix it with the nitrogen-containing material, with the finely divided inert material, or both, for ultimately emplacing the effective amount on the surface of the nitrogen-containing material. The finely divided inert material may be dusted into the nitrogen-containing material in accordance with conventional practice to emplace the effective amount of the finely divided inert material on the surface of the nitrogen-containing material, in conjunction with the alkene sulfonate. If desired, rotary mixing drums or other apparatus or vessels known to the art may be employed to effect the desired substantially uniform admixture.

The following examples set forth, solely by way of illustration, embodiments of this invention. The percents are percents by weight, unless otherwise noted. In the first group of examples, a laboratory test was devised to measure the percent caking. In the laboratory tests, the following procedure and equipment were used. A sample of 50 grams, unless otherwise specified, of the nitrogen-containing mixture was weighed into four ounce bottles and the desired coating agent was then added and the bottle capped. It was then placed on a ball mill which rolled the bottle at approximately 60 revolutions per minute (rpm) in order to distribute the coating agent. This process is similar to the coating drums used in industry. If a liquid and then a solid treatment were required, each application was effected by rolling for ten minutes on this ball mill. The treated nitrogen-containing material was then placed in a caking cell with a lucite disc in the bottom. When the treated nitrogen-containing material had been poured into the cell a second lucite disc was placed on top thereof. The cell was then placed in a caking box and the plunger was positioned such that it rested on the center of the top disc. The plunger was loaded with the necessary weights to give the correct pressure; for example, equivalent to 3 pounds per square inch (psi), or 7 psi, or 12 psi. The pressures were chosen to simulate the load imposed on the nitrogen-containing material at the bottom stack of bags or pile in typical warehouse storage. After the cells had remained undisturbed for the desired length of time; for example, one week; they were removed from the caking box and carefully opened by releasing the clamps from around the shell and removing the clamp and half of the cell. The caked material was then put on a number 7 mesh screen and the material passing through was weighed and the percent caked was then calculated from what remained on the screen.

The caking cells were made by cutting 1½ inch polyvinyl chloride (PVC) pipe into 3½ inch lengths and then cutting these cylinders, or lengths, in half, lengthwise. Hose clamps that expanded from 1 5/16 to 2¼ inch were used to hold the two halves of the cell together. The lucite discs were made by cutting ¼ inch thick pieces from lucite plastic rod which was 1½ inch in diameter. The caking box was used to align the plungers over the caking cells on three platforms, the bottom holding the caking cells with 1 inch holes to maintain the plunger vertical. The plungers were 1 inch diameter wooden rods 11 inches long with four inch disc attached at the top such that weights could be placed on the disc. In an earlier application, this test had correlated well with actual tests in a warehouse using conventional bag tests.

In addition to the percent caked, a crush test was performed and the amount of weight required to crush the speciment was noted. In addition, the test specimens were blown to note the dusting tendency before the crush test was performed.

In these examples the sodium salts of the respective named alkene sulfonates were employed unless otherwise noted.

EXAMPLE I

This example illustrates the effectiveness of the octene-1 sulfonate in reducing the cake strength of an ammonium nitrate (NH$_4$NO$_3$) having 0.08 percent water content. Tests were run on the ammonium nitrate without any treatment as a control; and on the ammonium nitrate that had been treated with two percent by weight (2%) of a mixture having a proportion of 1 percent of octene-1 sulfonate, sodium salt, and 99 percent by weight of kaolin. The control and the treated ammonium nitrate were put in caking cells and subjected to 12 pounds per square inch (psi) pressure for four days while being subjected to seven cycles from ambient to 110° F. Table 1, hereinafter, summarizes the results of these tests.

Table I

| Chemical Treatment of NH$_4$NO$_3$ | Percent Caked | Crust test (pounds to crush) | Dust Lost (milligrams) |
|---|---|---|---|
| Control (no treatment) | 100 | 280 | 8 |
| 2% octene-1 sultonate and kaolin | 99.8 | 84 | 48.9 |

As can be seen, the force required to crush the cake was reduced from 280 pounds on the untreated ammonium nitrate to only 84 pounds on the treated ammonium nitrate.

EXAMPLE II

This example illustrates the effectiveness of even small amounts of treatment in reducing the caking tendencies of the ammonium nitrate. In this example, a second sample of ammonium nitrate was subjected to the same caking test described with respect to Example I. In this example, however, only 0.2 percent by weight of the admixture of the octene-1 sulfonate and the kaolin described in Example I were employed in treating the ammonium nitrate. In this test run, similarly as in Example I, the caking test was run through seven cycles from ambient to 110° F at 12 psi. Table II hereinafter summarizes the results.

Table II

| Chemical Treatment of NH$_4$NO$_3$ | Percent Caked | Crust test (pounds to crush) | Dust Lost (milligrams) |
|---|---|---|---|
| Control (no treatment) | 100 | 310 | 1.2 |
| 0.2% octene-1 sulfonate and kaolin | 86 | 22 | 3.4 |

As can be seen, only 0.2 percent by weight was effective on the second sample of ammonium nitrate in reducing the caking much more dramatically than in the ammonium nitrate of Example I.

EXAMPLE III

This example illustrates the effectiveness of an intermediate proportion, or concentration, of the additive in reducing the cake strength. It also shows a comparison with employing the same proportion of the kaolin alone. In this example a third sample of ammonium nitrate was tested at 12 psi, running 7 cycles of from ambient to 110° F for 12 hours per cycle. One sample had no chemical treatment, one sample had 1 percent by weight of an admixture of 1 percent by weight of the octene-1 sulfonate and 99 percent by weight of kaolin clay; whereas a third sample was treated with 1 percent by weight of the kaolin clay alone. Table III hereinafter summarizes the results of these tests.

Table III

| Chemical Treatment of NH$_4$NO$_3$ | Percent Caked | Crust Test (pounds to crush) | Dust Lost (milligrams) |
|---|---|---|---|
| Control (no treatment) | 100 | 200 | 11.3 |
| 1% octene-1 sulfonate and kaolin | 100 | 112 | 109.9 |
| 1% kaolin | 100 | 162 | 69.9 |

Thus, it can be seen that as little as 0.01 percent by weight of the octene-1 sulfonate enhances the efficacy of the kaolin in reducing the strength of the cake formed by the ammonium nitrate over the ammonium nitrate alone or over the ammonium nitrate plus the kaolin.

EXAMPLE IV

This example illustrates the effectiveness of the octene-1 sulfonate alone in reducing the cake strength of ammonium nitrate. In this example, a fourth sample of ammonium nitrate was tested in accordance with a test procedure patented in U.S. Pat. No. 3,481,187, entitled "Method for Determining the Effectiveness of Anti-Caking Agent," James Passmore, inventor. Briefly summarized, 50 gram samples of the ammonium nitrate were placed in respective cylinders and subjected to 12 psi pressure for 18 hours during which the temperature was cycled in two separate cycles from ambient to 120° F and the force required to penetrate the cake by a ⅛ inch diameter penetrometer was measured. In both the control and treated samples of ammonium nitrate, 100 percent caking was effected by the test. Table IV summarizes the results of the test.

Table IV

| Chemical Treatment of $NH_4NO_3$ | Force Required to Penetrate Cake (pounds) |
| --- | --- |
| Control (no treatment) | 99 |
| 0.1% octene-1 sulfonate | 60 |

Thus, it can be seen that as little as 0.1 percent by weight of the sodium salt of the octene-1 sulfonate was sufficient to reduce the strength of the cake by 30 percent.

EXAMPLE V

This example illustrates the effect of concentration of the octene-1 sulfonate in imparting good anti-caking properties. In this example ammonium nitrate prills, uncured, uncoated and containing 0.06 percent by weight water by Karl Fisher analysis were treated with octene-1 sulfonate, sodium salt, similarly as described with respect to Example IV. The same sample size was also employed as described with respect to Example IV. All samples of the ammonium nitrate were caked 100 percent before penetration. Table V hereinafter summarizes the results of these caking tests with temperature cycling.

Table V

| Chemical Treatment of $NH_4NO_3$ | Force Required to Penetrate Cake (pounds) |
| --- | --- |
| Control (no treatment) | 80 |
| 0.05% octene-1 sulfonate | 62 |
| 0.1% by weight octene-1 sulfonate | 42 |

Thus, it can be seen that a concentration of 0.1 percent of the octene-1 sulfonate is more effective than 0.05 percent thereof in reducing the cake strength of the ammonium nitrate prills.

EXAMPLE VI

This example illustrates the effect of chain length of the alkene-1 sulfonate, sodium salt, employed in treating ammonium nitrate prills having 0.046 percent by weight water by Karl Fisher analysis were treated with the indicated concentrations of the respective alkene sulfonates and subjected to the same test procedure as described hereinbefore with respect to Example IV. Table VI hereinafter summarizes the results of the caking and temperature cycling test runs.

Table VI

| Chemical Treatment of $NH_4NO_3$ | Force Required to Penetrate Cake (pounds) |
| --- | --- |
| Control (no treatment) | 81 |
| 0.05% by weight octene-1 sulfonate[1] | 46 |
| 0.1% octene-1 sulfonate | 40 |
| 0.05% tetradecene-1 sulfonate[2] | 46 |
| 0.1% tetradecene-1 sulfonate | 36 |
| 0.05% hexadecene-1 sulfonate[3] | 49 |
| 0.1% hexadecene-1 sulfonate | 35 |
| 0.05% octadecene-1 sulfonate[4] | 36 |
| 0.1% octadecene-1 sulfonate | 30 |

% denotes percent by weight
[1]sodium salt of octene-1 sulfonate, spray dried, containing 4.39% volatiles
[2]sodium salt of tetradecene-1 sulfonate, drum dried, containing 6.75% volatiles
[3]sodium salt of hexadecene-1 sulfonate, drum dried, containing 3.30% volatiles
[4]sodium salt of octadecene-1 sulfonate, drum dried, containing 3.91% volatiles The data indicate that higher molecular weight alkene sulfonates decrease the caking tendency of the ammonium nitrate more than the lower molecular weight alkene sulfonates.

EXAMPLE VII

This example demonstrates a blending of alkene sulfonates to achieve an intermediate average molecular weight and the resulting effectiveness in imparting good anti-caking properties. In this example, octene-1 sulfonate, sodium salt, having 0.9 percent by weight of sodium sulfate, and octadecene-1 sulfonate, sodium salt, were blended in various proportions and employed to treat the ammonium nitrate prills described with respect to the preceeding Example VI. The same accelerated anti-caking test procedure, with temperature cycling, was employed as described hereinbefore with respect to Example IV. The sodium salt of the alkene sulfonate was employed. The prefix C-8 or C-18 denotes the respective octene and octadecene radicals. The average number of carbon atoms (C's) denotes the average number of carbon atoms in the alkene radical in Table VII. A concentration of 0.1 percent of the respective blends of the alkene sulfonates was employed to treat the ammonium nitrate. This concentration is omitted from Table VII to avoid confusion.

Table VII

| Chemical Treatment of $NH_4NO_3$ | Average No. of C's | Force Required to Penetrate Cake (pounds) |
| --- | --- | --- |
| Control (no treatment) | — | 97 |
| C-8 alkene sulfonate | 8 | 61 |
| 5% C-18 + 95% C-8 alkene sulfonate | 8.5 | 46.5 |
| 10% C-18 + 90% C-8 alkene sulfonate | 9 | 39 |
| 30% C-18 + 70% C-8 alkene sulfonate | 11 | 39 |
| 50% C-18 + 50% C-8 alkene sulfonate | 13 | 47 |

Table VII-continued

| Chemical Treatment of $NH_4NO_3$ | Average No. of C's | Force Required to Penetrate Cake (pounds) |
| --- | --- | --- |
| 60% C-18 + 40% C-8 alkene sulfonate | 14 | 35 |
| 80% C-18 + 20% C-8 alkene sulfonate | 16 | 38.5 |
| 90% C-18 + 10% C-8 alkene sulfonate | 17 | 27 |
| C-18 alkene sulfonate | 18 | 24 |

In this example, the higher the average molecular weight, the more effective was the alkene sulfonate in inducing good anti-caking properties. Economy and availability, however, indicate that no more than about 22 carbon atoms will be employed, ordinarily.

EXAMPLE VIII

This example demonstrates the efficacy of different molecular weight alkene sulfonates, including a blend having up to 26 carbon atoms therein, in decreasing the caking tendency of, or imparting good anticaking properties to, granulated diammonium phosphate (DAP). The granulated diammonium phosphate had 0.13 percent by weight water and had the commercial designation 16-48-0.

Respective 50 gram samples of the diammonium phosphate were tumbled by hand for three minutes with the respective ingredients. The ingredients included respective sodium salts of the following alkene sulfonates: octene-1 sulfonate, tetradecene-1 sulfonate, hexadecene-1 sulfonate and octadecene-1 sulfonate. In addition, the diammonium phosphate was treated with indicated concentrations of a mixture of an economical alkene sulfonate, referred to as C12–C26 alkene sulfonate, 1 percent solids on oven-dried kaolin. The respective samples were subjected to 12 psi pressure for seven days at ambient temperature. The degree of caking was evaluated by the penetration test described hereinbefore. The percent free flowing was the weight percent that was unlumped. Table VIII summarizes the results.

Table VIII

| Chemical Treatment of DAP | Force Required to Penetrate Cake (pounds) | Percent Free Flowing After Penetration |
| --- | --- | --- |
| Control (no treatment) | 3.3 | 66 |
| 0.1% C-8 alkene sulfonate | 4.7 | 67 |
| 0.1% C-14 alkene sulfonate | 2.6 | 69 |
| 0.1% C-16 alkene sulfonate | 2.8 | 72 |
| 0.1% C-18 alkene sulfonate | 2.5 | 70 |
| 1% (1% C-12 – C-26 alkene sulfonate on 99% kaolin) | 1.4 | 95 |
| 2% (1% C-12 – C-26 alkene sulfonate on 99% kaolin) | 0.7 | 100 |

A fresh, free flowing sample required 0.6 pounds to penetrate the cake following compaction at 12 psi. Thus, it can be seen that the higher molecular weight alkene sulfonates including the alkene sulfonate containing up to 26 carbon atoms, is effective as anti-caking agent for diammonium phosphate, particularly in combination with the kaolin clay.

EXAMPLE IX

This example is included to demonstrate the efficacy of the same group of alkene sulfonates described hereinbefore with respect to Example VIII but in inducing good anti-caking properties to, or decreasing the caking of, urea. In this example urea prills capable of analyzing 46 percent nitrogen and containing 0.1 percent by weight of water were treated with the respective agents described in Example VIII. In this example, repective 50 gram samples of urea were treated with the respective agents by hand tumbling for 3 minutes and then subjected to 12 psi pressure for 7 days at ambient temperature. The degree of caking was evaluated by the penetration test described hereinbefore. The percent free flowing was the weight percent unlumped. Table IX summarizes the results.

Table IX

| Chemical Treatment of Urea | Force Required to Penetrate Cake (pounds) | Percent Free Flowing Before Penetration | After Penetration |
| --- | --- | --- | --- |
| Control (no treatment) | 5.8 | 0 | 80 |
| 0.1% C-8 alkene sulfonate | 2.5 | 6 | 75 |
| 0.1% C-14 alkene sulfonate | 3.9 | 0 | 73 |
| 0.1% C-16 alkene sulfonate | 5.0 | 0 | 63 |
| 0.1% C-18 alkene sulfonate | 7.5 | 0 | 60 |
| 1% (1% C12–C26 alkene sulfonate + 99% kaolin) | 3.5 | 2 | 95 |

A fresh sample of urea prills was compacted at 12 psi and required 2.2 pounds to penetrate the resulting cake. Thus, it can be seen that the lower molecular weight alkene sulfonates are more effective in treating urea prills to reduce the caking tendency. The admixture including the higher molecular weight alkene sulfonates on clay was highly effective, however.

EXAMPLE X

In this example, the alkene sulfonates and vinylidene sulfonates are demonstrated to be effective in reducing the caking tendency of ammonium nitrate. Ammonium nitrate prills containing 0.05 percent by weight of water were treated with the respective ingredients of C12–C26 alkene sulfonate, sodium salt, 1 percent solids on kaolin; with C-18 vinylidene sulfonate, 1 percent solids on kaolin, oven dried. The C-18 vinylidene sulfonate is available from Gulf Chemical Co. It is a sulfonated condensation product formed by uniting two nonene-1 molecules and sulfonating the product. The standard accelerated temperature cycling test was run on respective 50 gram samples. The results were evaluated by penetration of the cake. Table X summarizes the results.

Table X

| Chemical Treatment of NH$_4$NO$_3$ | Force Required to Penetrate Cake (pounds) | Percent Free Flowing After Penetration |
|---|---|---|
| Control (no treatment) | 79 | 0 |
| 1% kaolin | 18 | 6 |
| 2% kaolin | 12 | 31 |
| 3% kaolin | 11 | 86 |
| 1% (1% C-18 vinylidene sulfonate + 99% kaolin) | 14.5 | 80 |
| 2% (1% C-18 vinylidene sulfonate + 99% kaolin) | 6.5 | 90 |
| 3% (1% C-18 vinylidene sulfonate + 99% kaolin) | 5.3 | 94 |
| 1% (1% C12–C26 alkene sulfonate + 99% kaolin) | 15 | 50 |
| 2% (1% C12–C26 alkene sulfonate + 99% kaolin) | 9.6 | 98 |
| 3% (1% C12–C26 alkene sulfonate + 99% kaolin) | 5.7 | 99 |

Thus, it can be seen that both the vinylidene sulfonate and the alkene sulfonates are effective in very small proportions on the kaolin in improving the anti-caking properties of the ammonium nitrate. In fact, Example X demonstrates that blends of various molecular weights with alkene sulfonates are approximately as effective as the straight chemical which has the same molecular weight. The use of the clay carrier allows surfactants that cannot be dried to powder to be tested for anti-caking properties.

EXAMPLE XI

This example is included to show an attempt to delineate the upper and lower levels of effective concentrations of octadecene sulfonate on ammonium nitrate. The sodium salt of octadecene-1 sulfonate was employed in the indicated concentrations on ammonium nitrate prills containing 0.05 percent by weight water. The octadecene-1 sulfonate, sodium salt, was drum dried and contained 96.1 percent by weight of solids. The standard accelerated test with temperature cycling was employed on respective 50 gram samples, untreated and treated with the indicated concentrations. The caking tendency was evaluated by penetration test for the cake as described hereinbefore. Table XI summarizes the results.

Table XI

| Chemical Treatment of NH$_4$NO$_3$ | Force Required to Penetrate Cake (pounds) | Percent Caked After Penetration |
|---|---|---|
| Control (no treatment) | 80 | 0 |
| 0.00625% C-18 alkene sulfonate | 68 | 0 |
| 0.0125% C-18 alkene sulfonate | 60 | 0 |
| 0.025% C-18 alkene sulfonate | 35 | 0 |
| 0.05% C-18 alkene sulfonate | 30 | 0 |
| 0.1% C-18 alkene sulfonate | 24 | trace |
| 0.25% C-18 alkene sulfonate | 13 | trace |
| 0.5% C-18 alkene sulfonate | 9.5 | 1.5 |
| 1% C-18 alkene sulfonate | 8 | 1.0 |
| 2% C-18 alkene sulfonate | 6.5 | 0 |

A fresh sample treated with 2 percent of the octadecene-1 sulfonate was compacted for 5 minutes at 25 psi and required 4.5 pounds to penetrate the cake.

From the foregoing it can be seen that as little as 1/8 pound of additive per ton effects some anti-caking property whereas as much as 2 percent by weight, or 40 pounds of additive per ton of ammonium nitrate, is even more effective than lesser amounts. Thus, apparently the upper limit for treating of ammonium nitrate is the feel and economics. At 2 percent by weight, the prills feel "tacky."

EXAMPLE XII

This example demonstrates the efficacy of different molecular weight alkene sulfonates, including a blend having up to 26 carbon atoms therein, in decreasing the caking tendency of, or imparting good anti-caking properties to, flake ammonium sulfate [(NH$_4$)$_2$SO$_4$]. The flake ammonium sulfate containing 0.053 percent moisture, was sized from −10 to +50 mesh. The same test as described with respect to Example VIII was performed on the ammonium sulfate; except that the concentrations of the alkene sulfonate differed. Table XII summarizes the results.

Table XII

| Chemical Treatment of $(NH_4)_2SO_4$ | Force Required to Penetrate Cake (pounds) | Percent Free Flowing After Penetration |
|---|---|---|
| 1 control (no treatment) | 58 | 4 |
| 2 control (no treatment) | 42 | 4 |
| 0.06% C-8 alkene sulfonate | 12 | 80 |
| 0.06% C-14 alkene sulfonate | 17 | 79 |
| 0.06% C-16 alkene sulfonate | 15 | 78 |
| 0.06% C-18 alkene sulfonate | 11 | 82 |
| 0.5% (1% C12–C26 alkene sulfonate + 99% kaolin) | 29 | 69 |
| 1.0% (1% C12–C26 alkene sulfonate + 99% kaolin) | 15 | 69 |

The alkene sulfonates are effective anti-caking agents for ammonium sulfate. The use of kaolin with the higher molecular weight alkene sulfonates did not improve performance.

Thus, it appears that a conventional nitrogen-containing product can be treated with a very small amount of the alkene sulfonate, alone or in combination with conventional finely divided inert materials, to increase the anti-caking properties of the nitrogen-containing product. By attention to concentrations, the specifications for the nitrogen-containing product can still be maintained.

Having thus described this invention, it will be understood that such description has been given by way of illustration and example and not by way of limitation; it being evident that various changes and modifications may be made in this invention without departing from the spirit and the scope thereof.

What is claimed is:

1. A composition of matter that flows freely and resists caking even on prolonged storage comprising particles of a nitrogen-containing material consisting essentially of ammonium salts useful as an ingredient of fertilizer and normally posing a problem with caking; said particles of said nitrogen-containing material having on their external surfaces an amount that is sufficient to reduce the normal caking tendency of the nitrogen-containing particles, of an alkene sulfonate in which the alkene moiety contains from 6–26 carbon atoms, inclusive; said particles of nitrogen-containing material also having on their external surface an amount that is sufficient to further reduce the caking thereof, of a finely divided inert material selected from the class consisting of magnesium carbonate, kieselguhr and clay, and having the properties of further reducing the caking.

2. The composition of claim 1 wherein said finely divided inert material comprises clay.

3. The composition of claim 1 wherein said clay is kaolin.

4. The composition of claim 1 wherein said alkene sulfonate is present in an amount that averages at least 0.01 percent by weight of the total composition and said finely divided inert material is present in an amount of at least 0.05 percent by weight of the total composition.

5. The composition of claim 1 wherein said alkene sulfonate and said finely divided inert material are present in a concentration such that the nitrogen-containing material can meet product specifications for nitrogen analysis, and no more than 2.9 percent by weight of the total composition.

6. A composition of matter that flows freely and resists caking even on prolonged storage consisting essentially of particles of a nitrogen-containing material consisting essentially of ammonium salts useful as an ingredient of fertilizer and normally posing a problem with caking; said particles of said nitrogen-containing material having on their external surfaces an amount that is sufficient to reduce the normal caking tendency of the nitrogen-containing particles, of an alkene sulfonate in which the alkene moiety contains from 6-26 carbon atoms, inclusive; said alkene sulfonate being in the form of dried solids that maintain their discrete identity.

7. The composition of claim 6 wherein said alkene sulfonate is present in an amount that averages at least 0.00625 percent by weight of the total composition.

8. The composition of claim 7 wherein said alkene sulfonate is present in an amount within the range of 0.05–2.9 percent by weight.

9. A method of treating a particulate nitrogen-containing material consisting essentially of ammonium salts useful as an ingredient of fertilizer and normally posing a problem with caking, in whatever form it is manufactured, to induce anti-caking properties consisting essentially of the steps of:
   a. preparing an alkene sulfonate in the form of samll particles with dried solids that form a powder, the alkene sulfonates maintaining their discrete identity and having an alkene moiety that contains 6–26 carbon atoms inclusive; and
   b. admixing the alkene sulfonate powder intimately with said particles of nitrogen-containing material in an amount that is effective to decrease the caking tendency of the nitrogen-containing material such that there is formed the composition of matter consisting essentially of the particles of said nitrogen-containing material having on their external surfaces an amount that is sufficient to reduce the normal caking tendencies thereof, of said alkene sulfonate; said alkene sulfonate being in the form of the dried solids that maintain their discrete identity.

10. The method of claim 9 wherein said alkene sulfonate is admixed in an amount that averages at least 0.00625 percent by weight of the total composition.

11. The method of claim 10 wherein said alkene sulfonate is admixed in an amount within the range of 0.05–2.9 percent by weight.

* * * * *